(12) United States Patent
Kampmann

(10) Patent No.: US 7,578,743 B2
(45) Date of Patent: Aug. 25, 2009

(54) TORSIONAL VIBRATION DAMPENER

(75) Inventor: Elmar Kampmann, Senden (DE)

(73) Assignee: MAN Nutzfahrzeuge AG (DE)

( * ) Notice: Subject to any disclaimer, the term of this patent is extended or adjusted under 35 U.S.C. 154(b) by 398 days.

(21) Appl. No.: 11/453,637

(22) Filed: Jun. 15, 2006

(65) Prior Publication Data

US 2006/0287115 A1 Dec. 21, 2006

(30) Foreign Application Priority Data

Jun. 16, 2005 (DE) .................... 10 2005 027 834

(51) Int. Cl.
*F16D 3/80* (2006.01)
(52) U.S. Cl. .......................... 464/24; 464/89
(58) Field of Classification Search ............. 464/24, 464/27, 89, 90
See application file for complete search history.

(56) References Cited

U.S. PATENT DOCUMENTS 4,828,533 A * 5/1989 Focqueur et al. ............. 464/24

FOREIGN PATENT DOCUMENTS

GB 954694 * 4/1964 .................. 464/27

* cited by examiner

*Primary Examiner*—Greg Binda
(74) *Attorney, Agent, or Firm*—Robert W. Becker; Robert Becker & Assoc.

(57) ABSTRACT

A torsional vibration dampener for dampening torsional vibrations of a rotationally driven shaft. A hub is axially connected to the shaft, and a rotationally symmetrical body of inertia that acts as a vibrational mass is connected to the hub by a rubber elastic ring. The body of inertia comprises a primary part and a secondary part that is coaxial therewith and pivotable thereto. Displacement chambers are formed by and disposed between the primary and secondary parts. At least two displacement chambers communicate with one another via at least one flow control mechanism. Relative movement between the primary and secondary parts alters the volumes of the displacement chambers such that the volume of one decreases by the amount by which the other increases. The displacement chambers are filled with hydraulic fluid to form a fluid coupling between the primary and secondary parts such that upon relative movement between them, due to the resulting change in volume of the displacement chambers hydraulic fluid flows from one displacement chamber into the other via the flow control mechanism.

15 Claims, 3 Drawing Sheets

SECTION A-A

SECTION B-B

TORSIONAL VIBRATION DAMPENER

BACKGROUND OF THE INVENTION

This specification for the instant application should be granted the priority date of Jun. 16, 2005, the filing date of the corresponding German patent application 10 2005 027 834.5.

The present invention relates to a torsional vibration dampener for dampening torsional vibrations of a rotationally driven shaft.

With rotationally driven shafts, e.g. the crankshafts of internal combustion engines, torsional vibrations often occur due to forces that act upon the shafts. The torsional vibrations cause great stress for the shaft and can, if they coincide with resonances of the shaft, even lead to breaking of the shaft. In order to cope with that it is common to provide torsional vibration dampeners, which, through the shifting of mass, dampen or eliminate the torsional vibrations. Two major groups of torsional vibration dampeners are thereby distinguishable, on the one hand so called resonant torsional vibration dampeners which, by means of elastic material deformation, essentially eliminate entirely the torsional vibrations that occur at certain speeds; on the other hand, torsional vibration dampeners that operate regardless of the speed and reduce torsional vibrations that occur via mechanical or fluidic friction and thus dampen it.

Resonant torsional vibration dampeners are known in various embodiments. A typical representative of that configuration is described for example in DE 588 245. A rubber ring is located, in a concentric manner, on the outer periphery of a hub that is connected to a crankshaft. A concentric outer ring that forms the vibrational mass is supported on the outer periphery of the rubber ring. The connection between the hub and the rubber ring on the one hand and between the rubber ring and the outer ring on the other hand is realized by means of friction fit, but can also be realized via other connection techniques such as vulcanizing or form fit. In torsional vibration dampeners of that kind, as mentioned above, the kinetic energy of certain torsional vibrations, for which the resonant torsional vibration dampener is adapted, is almost entirely eliminated through elastic material deformation. However, that means that resonant torsional vibration dampeners have practically no effect at other speeds than those for which they are adapted. A further problem is dissipating the heat that is released on account of the elastic material deformation.

Torsional vibration dampeners that operate according to the principle of hydraulic dampening regardless of the speed usually have a primary part that is fixedly attached to the shaft that is to be dampened and, arranged in a concentric manner in relation to the primary part, a secondary part that forms the vibrational mass and is pivotable—about a certain angle of rotation—around the common axis of rotation. Displacement chambers, arranged in a concentric manner in relation to the axis of rotation, are located between the primary and the secondary part. The displacement chambers communicate with each other via throttle or flow control locations. Relative movements between the primary and the secondary part change the volume of, in each case, two associated displacement chambers that are connected by means of a flow control location in such a way that the volume of the one displacement chamber decreases by the same amount that the volume of the other one increases. The displacement chambers are filled with a hydraulic fluid, so that in the case of a relative movement between the primary and the secondary part, due to the resulting change in volume of the displacement chambers, hydraulic fluid flows from the one displacement chamber through the flow control locations into the other displacement chamber. As a result of the fluidic friction in the flow control location, the system is deprived of kinetic energy via transformation into heat and hence, the system is dampened.

A torsional vibration dampener or a torsionally-elastic coupling of the aforementioned kind can be seen for example in DE 198 39 470 A1. Herein, spring elements for the transfer of the torque are provided between the primary and the secondary part. Associated with the displacement chambers is a fluid supply means with a feed pump, by means of which hydraulic fluid is pumped through supply channels into the displacement chambers. The hydraulic fluid flows back through backflow channels into a backflow chamber. The purpose of the fluid supply means is thereby to remove the air from the displacement chambers and to ensure that the displacement chambers, even prior to the start, are filled without enclosed air, so that at the time of the start the entire dampening capacity is available.

It is a disadvantage of torsional vibration dampeners operating on the basis of fluidic friction that they can dampen particularly pronounced torsional vibrations with large angles of shift or displacement, which occur for instance when passing through the resonance speeds of the shaft, only in an unsatisfactory manner.

Proceeding from the factual situation described above, it is an object of the present invention to configure a torsional vibration dampener, which, on the one hand, is effective over the entire speed range and, on the other hand, eliminates torsional vibrations with particularly large angles of shift or displacement. In a further development of the object, the torsional vibration dampener is to be configured in such a way that the heat that is released through the dampening can be dissipated easily and that an application on internal combustion engines used in vehicles is possible with little space being required.

The torsional vibration dampener of the present application comprises a hub that is adapted to be coaxially connected to the rotationally driven shaft relative to the axis of rotation thereof so as to rotate therewith, a rubber elastic ring connected to the hub, and a rotationally symmetrical body of inertia that is connected to the rubber elastic ring and acts as a vibrational mass. The body of inertia comprises a primary part and a secondary part, wherein the second part is coaxial relative to the primary part and is pivotable about a given angle relative to the primary part. Displacement chambers are formed by and are disposed between the primary part and the secondary part, wherein at least two of the displacement chambers communicate with one another via at least one flow control means. Relative movement between the primary part and the secondary part alters the volumes of each of the two displacement chambers that communicate with one another via the flow control means such that the volume of one of the displacement chambers decreases by the same amount by which the volume of the other displacement chamber increases. The displacement chambers are filled with a hydraulic fluid such that a fluid coupling is formed between the primary part and the secondary part. Upon a relative movement between the primary part and the secondary part, due to the resulting change in volume of the displacement chambers hydraulic fluid flows from the one displacement chamber into the other displacement chamber via the flow control means.

The torsional vibration dampener according to the invention is comprised of a resonant torsional vibration eliminator and a torsional vibration dampener and hence combines the advantages of both dampener types in one structural part. The torsional vibration dampener operates, regardless of the speed, according to the principle of hydraulic dampening and is practically applied onto the resonant torsional vibration eliminator. Furthermore, a torsional vibration dampener according to the invention does not require more space than a conventional torsional vibration dampener that operates according to one of the aforementioned principles. Moreover, it is advantageous that, in the case of resonance, the movements with relatively large angles of shift or displacement, which occur on the part between the hub and the vibrational mass that eliminates the resonant torsional vibrations, are additionally dampened by the hydraulically operating damper part.

Furthermore, since hydraulic fluid under pressure is supplied permanently to the displacement chambers, and since the excess hydraulic fluid is drained from the displacement chambers, an efficient removal of heat from the torsional vibration dampener is possible in an advantageous way.

An advantageous optimization of the configuration is provided in that the hydraulic fluid is supplied from the hub and the discharge flows back into the hub. Hence, the hydraulic fluid flows through the entire torsional vibration dampener, and consequently through the resonant torsional vibration dampener part as well, and the removal of heat is increased.

The inflow of the hydraulic fluid into the flow control location or means between two displacement chambers and the discharge of the redundant hydraulic fluid from the flow control location between two displacement chambers utilizes, in an advantageous way, the favorable pressure conditions in those locations and has the further advantage that for two displacement chambers only one inflow and one outflow opening is needed.

A simple and therefore advantageous arrangement of the configuration is accomplished by placing the intermediate parts in apertures in the primary part, since one aperture and one intermediate part, without a further expenditure, form two displacement chambers that are connected via throttle or flow control gaps. The advantageous configuration is supplemented in that the position of the intermediate parts is fixed relative to the primary part and relative to one another via the housing. In conjunction with the housing, the intermediate parts form the secondary part.

A particularly even and therefore advantageous inflow of the hydraulic fluid is realized in that the hydraulic fluid, coming from a distribution chamber in the hub, flows in a star-shaped, radial manner towards an annular chamber, which is located at the greatest possible distance from the hub. The return flow starts at the displacement chambers and leads, in a star-shaped, radial manner, to an annular discharge channel in the hub. Analogous points of the hydraulic circuit therefore have equal pressure conditions. Furthermore, the star-shaped, radial flow through the entire configuration causes an even and hence advantageous removal of heat from all parts of the torsional vibration dampener.

The first bores are configured as step nozzles, which lead from the annular chamber to the displacement chambers. That configuration essentially prevents, in an advantageous way, the backflow of the hydraulic fluid into the supply channels due to turbulences that are caused in the opening area of the corresponding step nozzle, so that back-pressure valves are unnecessary.

The ratio between the cross-sectional area of one of the first bores to the cross-sectional area of one of the outer flow control gaps and, respectively, the relation between the cross-sectional area of one of the second bores to the cross-sectional area of one of the inner flow control gaps lies in the range of 1:8 to 1:12. Consequently, in the case of a relative movement between the primary part and the secondary part, the transport of hydraulic fluid—in an advantageous way—occurs mainly through the flow control gaps. Hence, the backflow of hydraulic fluid into the supply channels or, respectively, the expulsion into the discharge channels is minimized and the dampening effect is maximized. On the other hand, the abovementioned dimensioning enables a sufficient and therefore advantageous quantity of flow of hydraulic fluid for the purpose of cooling the torsional vibration dampener.

Furthermore, it is particularly advantageous that in torsional vibration dampeners according to the invention that are installed on crankshafts of internal combustion engines, the lubricating oil from the lubricating circuit of the internal combustion engine can be used as the hydraulic fluid. A separate circuit for the hydraulic fluid is thus not necessary. The supply of the hydraulic fluid through a bore located in the rotationally driven shaft minimizes the expenditure in an advantageous way. Especially in internal combustion engines, the connection to the system of oil bores, which already exists in the crankshaft, can be realized via a simple connection bore.

A further advantage is that the hydraulic fluid flows out of the torsional vibration dampener through a bore in the rotationally driven shaft, e.g. the crankshaft of an internal combustion engine. The returning lubricating oil can hereby simply be led through the crankshaft to the oil pan that serves as the supply reservoir for the lubricating oil.

BRIEF DESCRIPTION OF THE DRAWINGS

In addition to the advantages mentioned above, further advantages and advantageous developments of the invention are explained in conjunction with the examples, which are described below in further detail with the aid of the accompanying schematic drawings, in which.

DESCRIPTION OF SPECIFIC EMBODIMENTS

In order to explain the torsional vibration dampener according to the invention, the premise of the following description is a resonant torsional vibration dampener in which the vibrational mass is modified in such a way that not only are vibrations occurring in a particular speed range eliminated, but a dampening of torsional vibrations is effective over the entire speed range.

Figure 1A:
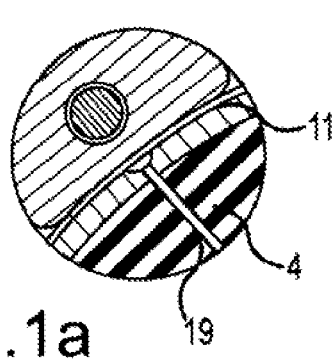
FIG. 1a is an enlarged cross-sectional view showing a portion of an inner flow control gap, in an exaggerated manner, taken in the vicinity of a bore in the primary part and the rubber elastic ring.
Figure 1B:
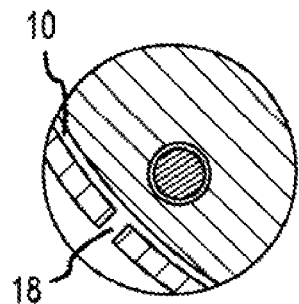
FIG. 1b is an enlarged cross-sectional view showing a portion of an outer flow control gap, in an exaggerated manner, taken in the vicinity of a bore in the primary part.
Figure 1:
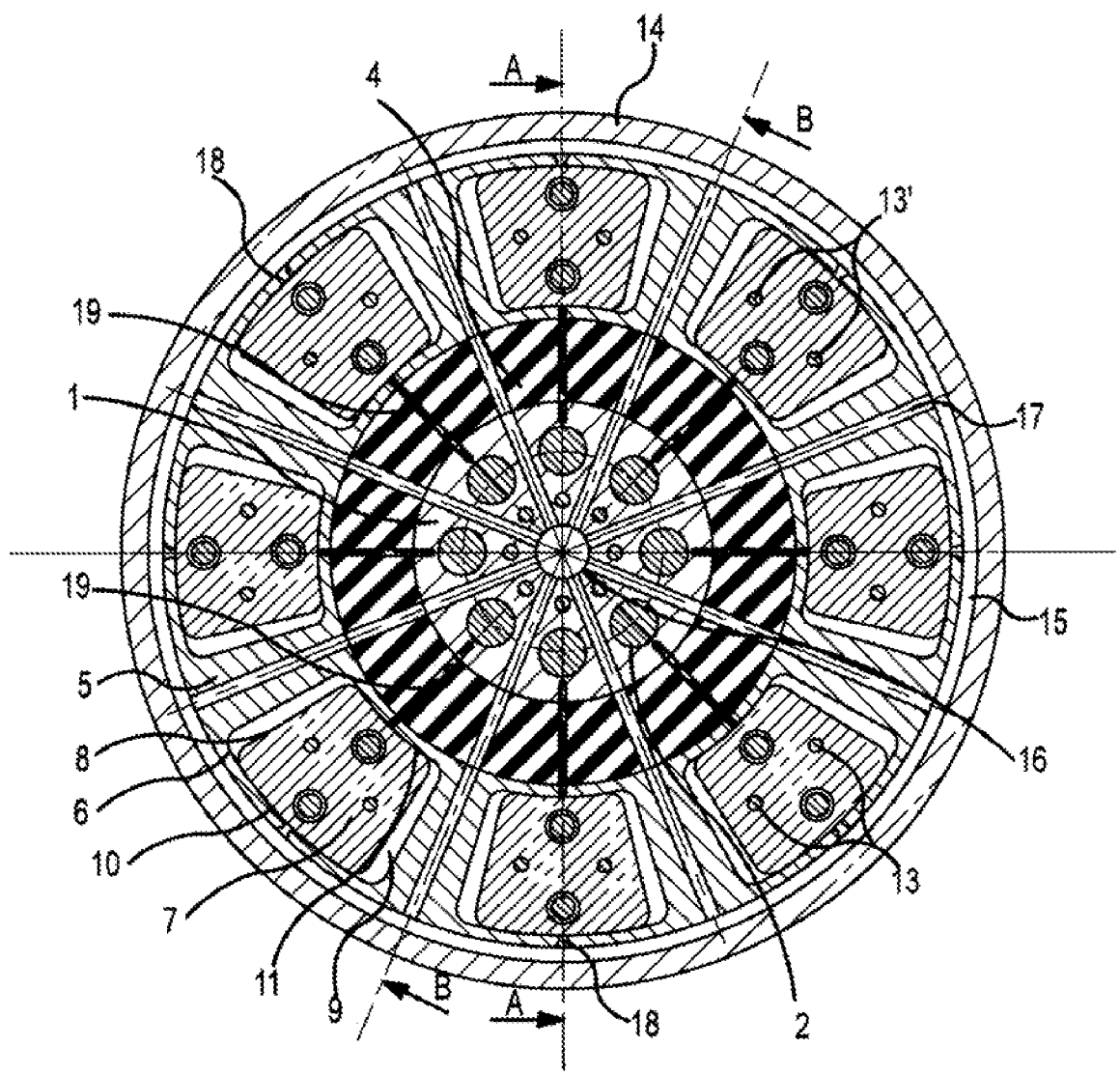
FIG. 1 shows a cross-sectional view through a torsional vibration dampener according to the invention, taken perpendicular to its axis of rotation.

FIG. 1 shows a cross-sectional view through a torsional vibration dampener, taken perpendicular to its axis of rotation, in a schematic representation. Proceeding from the representation in FIG. 1, one exemplary embodiment of the invention is described below in conjunction with FIGS. 2 and 3, which show a cross-sectional view through the torsional vibration dampener, taken along the line A-A (FIG. 2) and, respectively, a cross-sectional view through the torsional vibration dampener, taken along the line B-B (FIG. 3). Since the configuration comprises many identical components, only a part of the components necessary for comprehension is provided with reference symbols.

A rubber elastic ring 4 is located on an hub 1 in a concentric manner and is connected to the hub 1 so as to move with it. The hub 1 is attached to a rotationally driven shaft 3 (FIG. 3) via screw holes 2 and corresponding bolts 2'. The rubber elastic ring 4 cooperates with the hub 1 and with a vibrational mass, which is likewise located on the rubber elastic ring 4 in a concentric manner and attached so as to move with it, in such a way, that the torsional vibrations, which occur at a certain speed, are essentially eliminated through the elastic deformation of the rubber elastic ring 4.

The vibrational mass itself has several components, which form a torsional vibration dampener that operates according to the principle of hydraulic dampening. Hence, a primary part 5, having the shape of an annular ring, is located on the rubber elastic ring 4 in a concentric manner and attached so as to move with it. The primary part 5 is provided with apertures 6 that are oriented in a concentric manner in relation to the axis of rotation and essentially have the shape of circular ring sectors. Moreover, Intermediate parts 7, which likewise essentially have the shape of circular ring sectors but are configured smaller compared to the apertures 6, are located in the apertures 6. The dimensions of the intermediate parts 7 are thereby chosen in such a way, that, between their outer periphery and the inner periphery of the apertures 6, pairs of displacement chambers 8, 9 are formed, which communicate with each other via an outer flow control gap 10 and an inner flow control gap 11, which are shown in an exaggerated manner in FIGS. 1a and 1b. Relative movement between the primary part 5 and the secondary part alters the volumes of such communicating displacement chambers 8, 9.

Figure 2:
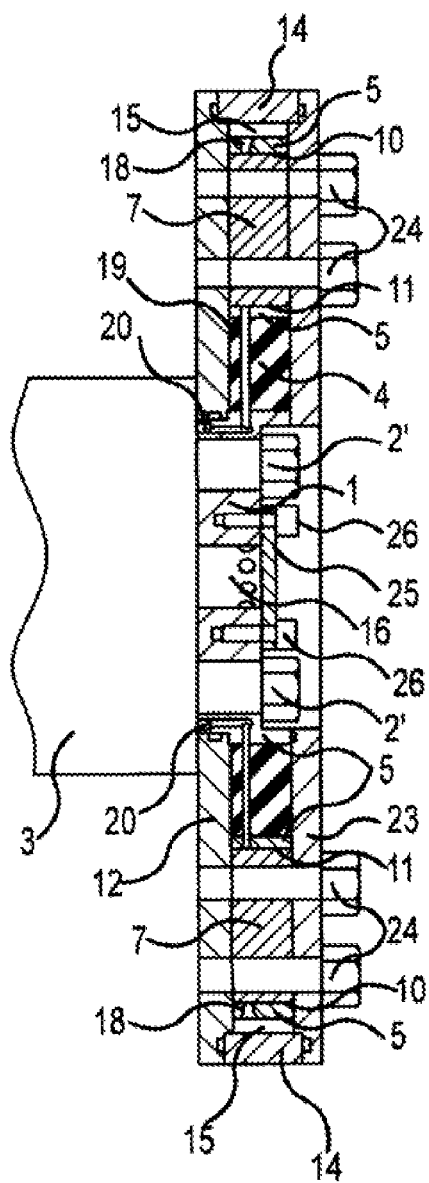
FIG. 2 shows a cross-sectional view through the torsional vibration dampener according to FIG. 1, taken along the line A-A.
Figure 3:
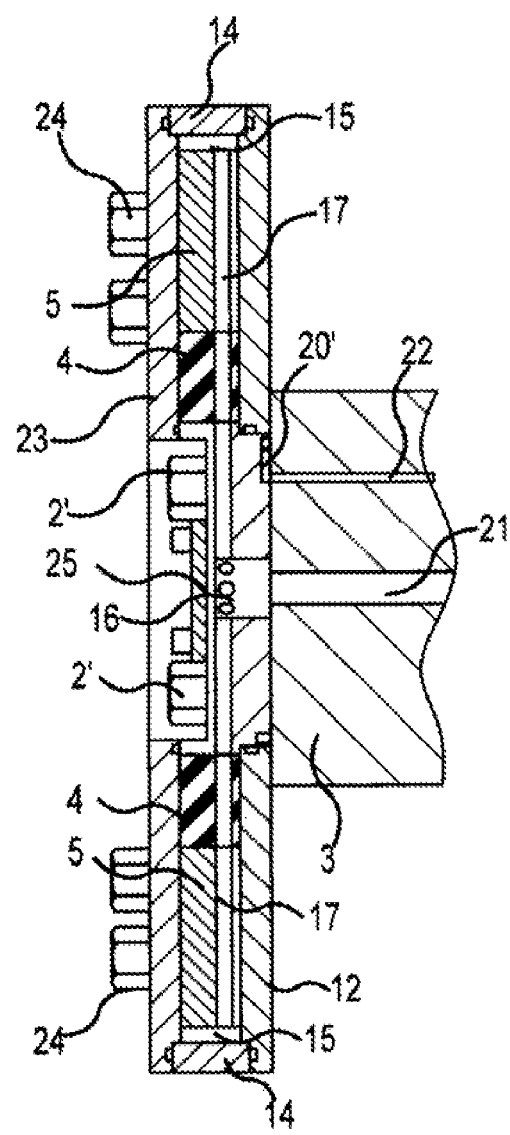
FIG. 3 shows a cross-sectional view through the torsional vibration dampener according to FIG. 1, taken along the line B-B.

The intermediate parts 7 are attached to each other and to the primary part 5 via a first housing lid 12 that has the shape of an annular ring, as can be viewed better in FIG. 2. The housing lid 12 is supported in an annular recess of the hub 1 in a fluid tight manner and so as to be pivotable. The fixation is realized by means of fitted pins 13 that are attached to the housing lid 12 and engage into corresponding openings 13' in the intermediate parts 7. In the area of its outer periphery, the first housing lid 12 is provided with an annular recess in which an outer ring 14 is attached in a fluid tight manner. The outer ring 14 is attached in a concentric manner in relation to the primary part 5 in such a way that an annular chamber 15 remains between the primary part 5 and the outer ring 14.

Distribution bores 17 extend through the primary part 5, the rubber elastic ring 4 and the hub 1 in a star-shaped, radial manner and serve to connect the annular chamber 15 with a distribution chamber 16, which is located in the center of the hub 1.

The connection of the displacement chambers 8, 9 to the annular chamber 15 is realized via first bores 18, which are configured as step nozzles and lead, starting at the annular chamber 15, into the apertures 6 at the center area of the outer flow control gap 10. Starting at the center of the apertures 6 in the area of the inner flow control gap 11, second bores 19 are arranged in a star-shaped, radial manner and extend through the primary part 5, the rubber elastic ring 4 and parts of the hub 1 and open out into a discharge channel 20, which extends through the hub 1 in an annular manner. The second bores 19 widen in a funnel-shaped manner in the area of the inner flow control gaps 11.

The distribution chamber 16 that is located in the hub 1 is connected to a feed pump for the hydraulic fluid (not represented) via a supply bore 21 which is located in the rotationally driven shaft 3. A discharge bore 22, which is also located in the rotationally driven shaft 3, connects the annular discharge channel 20, via a short radial groove 20' that is located in the hub 1, with a reservoir for the hydraulic fluid (not represented).

The areas of the torsional vibration dampener that conduct the hydraulic fluid are sealed by a second housing lid 23 that has the shape of an annular ring. The outside diameter of the second housing lid 23 is essentially equivalent to the first housing lid 12. Likewise, in the area of its outer periphery, the second housing lid 23 is provided with an annular recess onto which the outer ring 14 is mounted in a fluid tight manner. The inner periphery of the second housing lid 23 is attached, likewise in a fluid tight manner and so as to be pivotable, to a second recess that extends around the hub 1 in an annular manner, so that a fluid tight housing is formed, enclosing the rubber elastic ring 4 and the primary part 5. As explained above, the intermediate parts 7 are fixedly attached to the first housing lid 12 via fitted pins 13 and are therefore practically parts of the housing. In order to enable the rotating of the housing and therefore a relative movement of the intermediate parts 7 in relation to the primary part 5, the intermediate parts 7, if viewed in the direction of the axis of rotation of the torsional vibration dampener, are configured slightly thicker than the rubber elastic ring 4 and the primary part 5, respectively. The intermediate parts 7, so to speak serving as distance spacers, determine the minimal distance between the first and the second housing lid. The fixation of the housing is realized by means of bolts 24, which extend through corresponding through holes in the second housing lid 23 and in the intermediate parts 7 and engage into threaded holes in the first housing lid 12. Thus, the bolts 24 clamp the housing lids 12,23 against one another via the intermediate parts 7 and the outer ring 14, forming a housing having a V-shaped cross-section.

A circular lid 25 serves for sealing that end of the distribution chamber 16 that faces away from the rotationally driven shaft 3. The lid 25 is attached to the hub 1 via bolts 26 and thus seals the distribution chamber 16 in a fluid tight manner.

The sealing means mentioned above can be realized by means of O-rings that are placed into annular recesses, but other methods for the sealing are also applicable. One skilled in the art is familiar with such means of sealing; a detailed description is therefore unnecessary.

In order to explain the functioning of the arrangement, the premise is made that the rotationally driven shaft 3 is the crankshaft of an internal combustion engine and that the torsional vibration dampener is hence operated on an internal combustion engine.

When the internal combustion engine is started, it builds up, in a known manner, the oil pressure for the lubricating oil by means of an oil pump that is located in the auxiliary drive of the internal combustion engine. Lubricating oil thus reaches the bearing locations of the crankshaft that are to be lubricated via the system of lubricating oil bores that is located in the crankshaft. As described above, a supply bore 21 is connected to that system of lubricating oil bores. Through the supply bore 21, the lubricating oil reaches the distribution chamber 16 and from there continues through the distribution bores 17 and reaches the annular chamber 15. Due to the central connection of the distribution channels, a steady oil pressure builds up in the annular chamber 15 and hence in all first bores 18, which, starting at the annular chamber 15, open out into the apertures 6.

By means of the first bores 18, which are configured as step nozzles, the lubricating oil is pressed into the apertures 6. In the opening area, the effect of the step nozzles is thereby strong turbulences, which essentially prevent a backflow of the lubricating oil, even if the pressure in that area rises temporarily.

The distribution of the lubricating oil in the apertures 6 is realized by means of the outer flow control gaps 10, through which the lubricating oil flows into the displacement chambers 8, 9. Since the first bores 18 open out into the apertures 6 in the center area of the flow control gaps 10, the result is an essentially even distribution of the lubricating oil in the displacement chambers 8, 9. Due to the constant supply of lubricating oil, the part of the oil that exceeds the holding capacity of the displacement chambers 8, 9 is pressed, via the second bores 19, into the discharge channel 20, which extends though the hub 1 in an annular manner. From the discharge channel 20, the oil flows through the radial groove 20' and the discharge bore 22, which extends through the crankshaft, and reaches the oil pan of the internal combustion engine (not represented).

It is to be understood that the backflow of the lubricating oil to the oil pan can also be realized, unlike the example described above, via a crankshaft gear that has an operative connection to the radial groove 20' or via a spacer between the radial groove 20' and the crankshaft.

In the manner described above, the lubricating oil circuit in the torsional vibration dampener fills up entirely with the lubricating oil that serves as hydraulic fluid so that a hydraulic coupling is realized between the primary part 5 and the secondary part, which is essentially comprised of the intermediate parts 7, the housing lids 12, 23 and the outer ring 14.

Due to the forces that act upon the shaft 3, especially on account of the pistons of the internal combustion engine, the torsional vibration dampener, thus filled with lubricating oil, is exposed to an irregular rotating motion. The shaft 3 with masses such as auxiliary aggregates coupled to it thereby acts as a vibratory system with multiple components, in which the irregular forces induce torsional vibrations. The types of vibration that occur thereby depend on the configuration of the engine and on the influences of the entire system and occur more or less pronounced. A 6-cylinder in-line engine can for example show pronounced vibrations of the 6. order at a speed of 1900 rpm, whereas over the entire speed range, less pronounced vibrations of different orders occur.

Figure 4:
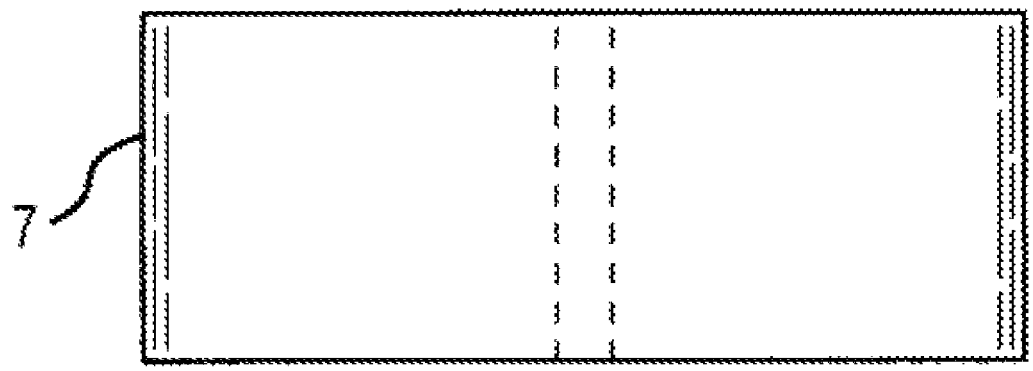
FIG. 4 is a plan view onto a radially outer side of an intermediate part.
Figure 5:
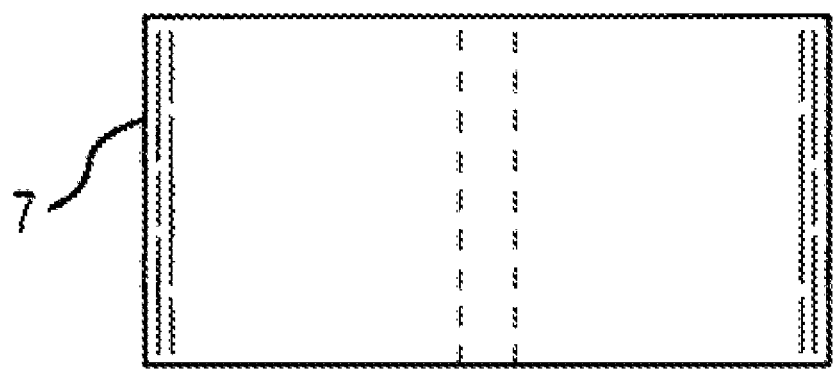
FIG. 5 is a plan view onto a radially inner side of an intermediate part.

In order to cope with those vibration conditions, the configuration according to the invention has, as mentioned above, a part for eliminating the resonant torsional vibrations, comprising a rubber elastic ring 4 that is attached to the hub 1 so as to move with it, and a vibrational mass, whereby the vibrational mass is essentially comprised of the primary part 5, the intermediate parts 7, the housing lids 12, 23 and the outer ring 14. A torsional vibration dampener, which operates according to the principle of hydraulic dampening, is superimposed onto the part for eliminating the resonant torsional vibrations. The torsional vibration dampener is comprised of the primary part 5 and the secondary part, whereby the secondary part essentially includes the intermediate parts 7, the housing lids 12, 23 and the outer ring 14. This configuration works in such a way that, regardless of the speed, the torsional vibration dampener, which operates according to the principle of hydraulic dampening, is effective. If torsional vibrations occur, accelerative forces act upon the secondary part, alternating in and against the direction of rotation, respectively. The secondary part tries to follow the movements initiated by the accelerative actions and, in an alternating manner, increases the pressure onto the lubricating oil that is enclosed in the displacement chambers 8, 9. This alternating variation in pressure attempts to equalize through the flow control gaps 10, 11 and thereby alternately displaces lubricating oil through the flow control gaps 10, 11 from one displacement chamber into the other. Regarding their dimensions and surface characteristics, the flow control gaps 10, 11 are configured in such a way that the greatest portion of the energy possible that is introduced into the torsional vibration dampener via the accelerative actions is converted into heat through fluidic friction in the flow control gaps 10, 11. The cross-sectional area of each of the outer flow control gaps 10 is significantly larger (8:1 to 12:1) than the cross-sectional area of the pertaining first bore 18, which, besides, is configured as a step nozzle, and the cross-sectional area of each of the inner flow control gaps 11 is significantly larger (8:1 to 12:1) than the cross-sectional area of the pertaining second bore 19. Therefore, the major part of the transport of lubricating oil takes place between the displacement chambers 8, 9, and merely a small portion of the lubricating oil is transported through the aperture 6 via the first and second bores 18, 19. The diameters of the first and the second bores 18, 19, seen absolutely, are dimensioned in such a way that the quantity of flow of the lubricating oil is sufficient to dissipate the heat released by the fluidic friction in the flow control gaps 10, 11. The plan views of FIGS. 4 and 5 show the radially outwardly (FIG. 4) and radially inwardly (FIG. 5) directed surfaces of an intermediate part 7 that face associated portions of the primary part 5 and where the outer flow control gap 10 and the inner flow control gap 11 respectively are located. These surfaces demonstrate the areas covered by the flow control gaps 10, 11.

In contrast to the hydraulic torsional vibration dampener described above, the effectiveness of the part for eliminating the resonant torsional vibration is limited to a particular type of vibration. The adaptation is realized for the type of vibration that causes the greatest angle of shift or displacement, in other words, the torsional vibration with the greatest vibrational amplitude. According to the example described above, that would be a vibration of the 6. order at a speed of 1900 rpm. The adaptation of the part for eliminating the resonant torsional vibration is thereby effected via the choice of the material from which the rubber elastic ring 4 is manufactured and via the dimensions of the aforementioned component in conjunction with the vibrational mass. The adaptation is realized in such a way, that, when passing through the corresponding speed range, the occurring torsional vibrations are essentially entirely eliminated through the elastic deformation of the rubber elastic ring 4.

With the configuration described above, it is possible to dampen a rotationally driven shaft, regarding the torsional vibrations that occur, over the entire speed range. Furthermore, it is possible to deliberately eliminate the torsional vibrations with a great angle of shift or displacement that occur in the range of the resonance speed. The heat released by the dampening or eliminating processes, respectively, can, in a simple manner, be dissipated by the hydraulic fluid, in this example by the lubricating oil of the internal combustion engine, which, at any rate, has to be recooled via pertaining cooling means, e.g. an oil cooler.

Numerous modifications and configurations, distinguished from the example described above, that proceed from the basic solution of the object and can be derived with the knowledge of one skilled in the art, are conceivable. Hereinafter, such alternatives and configurations are only considered briefly.

In certain applications, the circulation of hydraulic fluid is unnecessary. That is the case when the quantity of heat released by the fluidic friction can be dissipated by other means, e.g. cooling fins or other cooling means. It is thereby essential that the areas that contain the hydraulic fluid are sealed hermetically, and that a temperature rise that alters the characteristics or the service life of the hydraulic fluid cannot occur.

For the connection of the rubber elastic ring 4 to the hub 1 or, respectively, the connection of the vibrational mass to the rubber elastic ring 4, form-fitting connections such as vulcanizing, gluing or indenting or also friction-fitting connections are conceivable. If, in the case of friction-fitting connections, a hydraulic circuit exists, the flow of the hydraulic fluid through the rubber elastic ring is to be ensured, e.g. via annular channels.

Spring elements that are supported on the primary part 5 and on the intermediate parts 7 can be provided in order to automatically center the intermediate parts 7 in the apertures 6 so that, at the start of the rotation of the shaft 3, the displacement chambers 8, 9, which are equally filled with hydraulic fluid, take effect.

The connection of the displacement chambers 8, 9 to the supply channels 15, 17, 21 and, respectively, to the discharge channel 20 for the hydraulic fluid can be realized separately for each displacement chamber 8, 9. Moreover, the flow control gaps 10, 11 can be replaced by other means that control or throttle the flowing over from one displacement chamber to the next. In cases in which the first bores 18, which are configured as step nozzles, are not sufficient in their effect to hinder the backflow into the supply means 15, 17, 21, back-pressure valves or alternatively one central back-pressure valve can be provided to prevent the backflow when the pressure is rising.

The specification incorporates by reference the disclosure of German priority document 10 2005 027 834.5 filed 16 Jun. 2005.

The present invention is, of course, in no way restricted to the specific disclosure of the specification and drawings, but also encompasses any modifications within the scope of the appended claims.

The invention claimed is:

1. A torsional vibration dampener for dampening torsional vibrations of a rotationally driven shaft, comprising:
   a hub that is adapted to be coaxially connected to said shaft relative to an axis of rotation thereof so as to rotate with said shaft;
   a rubber elastic ring connected to said hub; and
   a rotationally symmetrical body of inertia that is connected to said rubber elastic ring and acts as a vibrational mass, wherein said body of inertia comprises a primary part and a secondary part, wherein said secondary part is coaxial relative to said primary part and is pivotable about a given angle relative to said primary part, wherein displacement chambers are formed by and are disposed between said primary part and said secondary part, wherein at least two of said displacement chambers communicate with one another via at least one flow control gap, wherein relative movement between said primary part and said secondary part alters the volumes of each two displacement chambers that communicate with one another via said flow control gap such that the volume of one of said displacement chambers decreases by the same amount by which the volume of the other of said displacement chambers increases, wherein said displacement chambers are filled with a hydraulic fluid such that a fluid coupling is formed between said primary part and said secondary part, wherein upon a relative movement between said primary and said secondary part, due to the resulting change in volume of said displacement chambers hydraulic fluid flows from the one displacement chamber into the other displacement chamber via said flow control gap, wherein said displacement chambers are provided with supply means and discharge means for said hydraulic fluid, wherein via said supply means, hydraulic fluid under pressure is continuously supplied from a storage reservoir, wherein excess hydraulic fluid flows back from said displacement chambers, via said discharge means, into said storage reservoir, and wherein said supply means to said displacement chambers, and said discharge means from said displacement chambers, are embodied such that upon relative movement between said primary part and said secondary part hydraulic fluid predominantly flows only between said displacement chambers that communicate with one another via said at least one flow control gap.

2. A torsional vibration dampener according to claim 1, wherein supply of said hydraulic fluid is effected from said hub through said rubber elastic ring and said primary part to said displacement chambers.

3. A torsional vibration dampener according to claim 1, wherein return of said hydraulic fluid is effected from said displacement chambers through said primary part and said rubber elastic ring to said hub.

4. A torsional vibration dampener according to claim 1, wherein supply of said hydraulic fluid is effected from said hub through said rubber elastic ring and said primary part to said at least one flow control gap between said displacement chambers.

5. A torsional vibration dampener according to claim 1, wherein return of said hydraulic fluid is effected from said at least one flow control gap between said displacement chambers through said primary part and said rubber elastic ring to said hub.

6. A torsional vibration dampener according to claim 1, wherein said body of inertia comprises:
   a rigid ring that is concentrically disposed on said rubber elastic ring and forms said primary part, wherein said rigid ring is provided with apertures that are concentrically disposed relative to an axis of rotation of said tortional vibration dampener, and wherein said apertures essentially have a circular ring sector configuration and are uniformly spaced apart;
   intermediate parts disposed in said apertures of said primary part, wherein said intermediate parts also have a circular ring sector configuration but are smaller than said apertures such that when viewed in a direction of rotation of said torsional vibration dampener, a respective one of said displacement chambers is formed on opposite sides of each intermediate part between an outer periphery of said intermediate part and an inner periphery of said aperture in which said intermediate part is disposed, and such that when viewed in a radial direction, disposed on a radially inner and a radially outer side of said intermediate part are an inner and an outer flow control gap respectively that provide communication between said displacement chambers;
   a first annular housing lid, on an inner side of which are secured said intermediate parts in conformity with their orientation in said apertures of said primary part;

a second annular housing lid having an outer diameter that corresponds essentially to an outer diameter of said first annular housing lid; and an outer ring disposed on said outer diameters of said first and second housing lids such that said outer ring, together with said housing lids, forms a housing that has a U-shaped cross-section and that extends about said primary part and said rubber elastic ring, wherein said housing is rotatably mounted on said hub in a fluid tight manner, and wherein said hydraulic fluid completely fills said displacement chambers.

7. A torsional vibration dampener according to claim 6, wherein said first housing lid is screw-connected with said second housing lid via the interposition of said intermediate parts, and wherein said outer ring, which is centered on said first and second housing lids via annular recesses, is held in a fluid tight manner between said housing lids by a clamping effect.

8. A torsional vibration dampener according to claim 6, wherein an annular chamber is formed in said U-shaped housing between an inner surface of said outer ring and said primary part, wherein a distribution chamber for said hydraulic fluid is centrally disposed in said hub and is adapted to be supplied with said hydraulic fluid via a pump, wherein distribution bores, extend through said primary part and said rubber elastic ring, wherein said distribution bores extend in a star-shaped, radial manner relative to said axis of rotation of said torsional vibration dampener, wherein said annular chamber is connected via said distribution bores with said distribution chamber, wherein first bores are provided in said primary part, in the area of said outer flow control gaps, and lead from said annular chamber into said apertures of said primary part, wherein an annular discharge channel is provided in said hub and communicates with a supply reservoir for said hydraulic fluid, and wherein second bores extend in a star-shaped, radial manner through said primary part, said rubber elastic ring and a portion of said hub and lead from said apertures, in the area of said inner flow control gaps, to said discharge channel.

9. A torsional vibration dampener according to claim 8, wherein said first bores are in the form of step nozzles that are each effective in a direction toward said apertures of said primary part.

10. A torsional vibration dampener according to claim 8, wherein said second bores widen in a funnel-shaped manner in the area of said inner flow control gaps.

11. A torsional vibration dampener according to claim 8, wherein the ratio of a cross-sectional area of one of said first bores to a cross-sectional area of one of said outer flow control gaps is in the range of between 1:8 and 1:12.

12. A torsional vibration dampener according to claim 8, wherein the ratio of a cross-sectional area of one of said second bores to a cross-sectional area of one of said inner flow control gaps is in the range of between 1:8 and 1:12.

13. A torsional vibration dampener according to claim 8, wherein said hydraulic fluid is lubricating oil that originates from a lubricating circuit of an internal combustion engine.

14. A torsional vibration dampener according to claim 8, wherein supply of hydraulic fluid is effected to said hub via at least one bore in said rotationally driven shaft.

15. A torsional vibration dampener according to claim 8, wherein withdrawal of said hydraulic fluid is effected out of said hub via at least one bore in said rotationally driven shaft.

* * * * *